United States Patent [19]
Masuda et al.

[11] Patent Number: 5,659,854
[45] Date of Patent: Aug. 19, 1997

[54] ELECTROSTATIC CHARGING MEMBER AND PHOTOCONDUCTOR DEVICE

[75] Inventors: Yoshitomo Masuda, Hamura; Hiroshi Kaneda, Kodaira; Tadashi Nakajima, Tokyo; Taro Miyamoto, Kodaira; Yuko Maeda, Akishima; Yasushi Inoue, Kodaira; Takahiro Kawagoe, Tokorozawa, all of Japan

[73] Assignee: Bridgestone Corporation, Tokyo, Japan

[21] Appl. No.: 521,409

[22] Filed: Aug. 30, 1995

[30] Foreign Application Priority Data

Aug. 30, 1994 [JP] Japan .................................. 6-205785
Nov. 29, 1994 [JP] Japan .................................. 6-319206
Nov. 30, 1994 [JP] Japan .................................. 6-321673

[51] Int. Cl.$^6$ ............................................. G03G 15/02
[52] U.S. Cl. ................................... 399/176; 361/221
[58] Field of Search ............................ 355/219; 361/220, 361/221, 225; 399/174, 176

[56] References Cited

U.S. PATENT DOCUMENTS 5,455,661  10/1995  Yoshida et al. .................... 355/219

FOREIGN PATENT DOCUMENTS 0629928  12/1994  European Pat. Off. ............. 355/219
0636949   2/1995  European Pat. Off. ............. 355/219

*Primary Examiner*—William J. Royer
*Attorney, Agent, or Firm*—Sughrue, Mion, Zinn, Macpeak & Seas

[57] ABSTRACT

A charging device for electrically charging a photoconductor drum includes a charging member adapted to be placed in contact with the drum and an element for applying voltage between the charging member and the drum. The charging member has a microhardness of 1–65 degrees at its surface in contact with the drum or at least a surface layer of the charging member in contact with the drum is formed of a polyurethane which is prepared from liquid MDI as an isocyanate component and a polyol.

14 Claims, 3 Drawing Sheets

ELECTROSTATIC CHARGING MEMBER AND PHOTOCONDUCTOR DEVICE

BACKGROUND OF THE INVENTION

1. Field of the Invention

This invention relates to a charging member and device for imparting electrical charge to an object, typically a photoconductor for use in electrophotography and electrostatic recording process, for example, copying machines and printers.

2. Prior Art

Conventional electrophotography as applied to copying machines and printers involves the steps of uniformly charging a photoconductor on the surface, projecting an image from an optical system onto the photoconductor to form a latent image in an exposed area where the electric charge is erased, applying toner to the photoconductor to form a toner image, and transferring the toner image to a record medium, typically paper.

The first step of electrically charging the photoconductor typically employs a corona discharge system. The corona discharge system, however, is undesirable from the standpoint of safety and maintenance of the machine since it requires application of as high voltage such as 5 to 10 kV. It also suffers from an environmental problem due to the emission of harmful substances such as ozone and NOx during corona discharge.

There is a need for an alternate charging system capable of charging at a lower applied voltage than for the corona discharge and minimizing emission of harmful substances such as ozone and NOx. One exemplary alternate charging system is a contact charging system as disclosed in Japanese Patent Application Kokai (JP-A) Nos. 205180/1989 and 211779/1989 wherein a charging member having voltage applied thereto is brought in contact with an object to be charged, such as a photoconductor, thereby charging the object. Known charging members for use in the contact charging system include conductive rubber rollers having conductive particles such as carbon dispersed in rubber and rollers having a layer of nylon or polyurethane coated on the conductive rubber rollers.

However, problems also arise with the contact charging system. For example, a conductive rubber roller having a coating layer performs well initially when used as a charging member. As the printing operation is repeated, the toner carried by the photoconductor drum past the cleaning blade will deposit and fuse to the surface of the conductive rubber roller. If the roller is used without removing such toner deposits, fog and other defects occur in the printed image. There is a likelihood that the toner deposits will be separated from the conductive roller and fused to the photoconductor, also causing defects to the printed image.

In this regard, it is empirically known that image defects can be eliminated to some extent by lowering the hardness of the entire roller, typically the Ascar C hardness of the conductive rubber roller.

The technique of lowering the Ascar C hardness of the roller for improvement in image quality is merely an empirical practice of those skilled in the art, but not a well established technique. In other words, lowering Ascar C hardness does not always improve image quality and can sometimes worsen image quality.

In order to provide a roller with a low Ascar C hardness, the hardness of a coating layer must be considerably low. A conductive rubber roller having a coating layer with such low hardness can closely adhere to the photoconductor at elevated temperature. Another means for lowering Ascar C hardness is to reduce the thickness of a coating layer, which can permit the roller to be broken upon voltage application. It is also possible to lower Ascar C hardness by lowering the hardness of a rubber elastomer layer. To this end, an amount of an extra component such as oil must be added to a rubber composition of which the elastomer layer is formed, and in a certain operational situation, the resulting conductive rubber roller allows the extra component to bleed out, staining the photoconductor. In order to provide a low hardness, it is essential to use flexible material, which in turn, recommends the use of a plasticizer. The plasticizer if added, however, this raises a staining problem in that it will migrate to the photoconductor and also causes the inconvenience that due to its tackiness, the charging member will tightly adhere to the photoconductor during long-term storage.

It is then difficult to provide an improved charging member by relying on the technique of lowering the hardness, typically the Ascar C hardness of the entire roller. The evaluation of a charging member in terms of Ascar C hardness has therefore not been well established.

Meanwhile, insofar as the inventors' research works are concerned, a conductive urethane foam which is rendered conductive by adding a quaternary ammonium salt, an electron acceptor capable of forming a charge transfer complex, an inorganic salt and/or carbon black is optimum among the charging members which satisfy all the requirements of a desired electric resistance, low hardness and low compression set.

A charging roller formed of such semi-conductive urethane foam, however, is less likely to stain the photoconductor. To overcome this problem, the charging roller is conventionally washed with a suitable solvent such as acetone prior to use. A large amount of used solvent and a cost of washing are problems.

SUMMARY OF THE INVENTION

A first object of the present invention is to provide a charging member which has improved charging properties, experiences minimized adhesion and fusion of toner, and is durable for long-term use as well as a charging device using the same.

A second object of the present invention is to provide a charging member which has a desired electric resistance, low hardness and low compression set while minimizing staining to a photoconductor to be charged therewith as well as a charging device using the same.

Regarding a charging member for electrically charging a photoconductor by placing the member in contact with the photoconductor and applying voltage between them, the inventors have found that the first object can be attained by adjusting the surface of the charging member in contact with the photoconductor to a microhardness of up to 65 degrees, preferably up to 60 degrees, more preferably 1 to 55 degrees. With such a limited surface microhardness, the charging member experiences minimized adhesion and fusion of toner and thus ensures production of images of quality. Additionally, the charging member is durable in use and thus ensures production of images of quality over a long term.

In conventional practice, the hardness of a charging member is controlled in terms of Ascar C hardness which is defined, when a hemispherical indenter having a diameter of 5.1 mm is forced against a sample, as the indentation depth at which the resistance of the sample is balanced with the internal restitution force. Therefore, the Ascar C hardness is the hardness throughout a thick surface region of a roller that extends from the surface to a substantial depth. In contrast, the microhardness is the hardness of a thin surface region of a roller since it is defined, when a needle having a diameter of 0.16 mm and a length of 0.5 mm is forced against a sample, as the depth of penetration of the needle, that is, deformation of the sample. The inventors have found that for the purpose of restraining the deposition or fusion of toner to a charging member, lowering the hardness of a very thin region of a charging member adjacent to its surface as expressed in terms of microhardness is quite effective rather than lowering the hardness of a thick region of a charging member as expressed in terms of Ascar C hardness.

Accordingly, in a first aspect, the present invention provides a charging member for electrically charging an object by placing the member in contact with the object and applying voltage between them, characterized in that the charging member has a microhardness of up to 65 degrees at its surface in contact with the object. The present invention also provides a charging device for electrically charging an object comprising a charging member adapted to be placed in contact with the object and means for applying voltage between said charging member and the object, characterized in that the charging member has a microhardness of up to 65 degrees at its surface in contact with the object.

Regarding a charging member for electrically charging a photoconductor by placing the member in contact with the photoconductor and applying voltage between them, the inventors have found that the second object of minimizing staining to the photoconductor can be attained by using liquid MDI such as crude diphenylmethane diisocyanate, urethonimine-modified diphenylmethane diisocyanate, carbodiimide-modified diphenylmethane diisocyanate, urethane-modified diphenylmethane diisocyanate and/or a hydrogenated one thereof as a curing agent for urethane foam instead of conventionally used tolylene diisocyanate (TDI). Among these liquid MDI members, crude diphenylmethane diisocyanate, simply referred to as crude MDI, especially one having a functionality of 2.0 to 5.0, more preferably 2.5 to 4.0 is especially effective for minimizing staining to the photoconductor. It is noted that MDI is abbreviation for methylene di-para-phenylene isocyanate or diphenyl-methane-4,4'-diisocyanate.

Accordingly, in a second aspect, the present invention provides a charging member for electrically charging an object by placing the member in contact with the object and applying voltage between them, characterized in that the surface of the charging member in contact with the object is formed of a polyurethane whose isocyanate component is liquid MDI. The present invention also provides a charging device for electrically charging an object comprising a charging member adapted to be placed in contact with the object and means for applying voltage between said charging member and the object, characterized in that the surface of the charging member in contact with the object is formed of a polyurethane whose isocyanate component is liquid MDI.

In one preferred embodiment, at least a surface layer of the charging member is comprised of a polyurethane which is prepared from a polyolefin polyol, a polyoxytetramethylene polyol or a mixture thereof as a polyol component and liquid MDI as an isocyanate component. This charging member solves many problems including durability problems such as toner fusion and deposition, photoconductor staining, and photoconductor seizure.

BRIEF DESCRIPTION OF THE DRAWINGS

The above and other objects, features and advantages of the present invention will be better understood by reading the following description taken in conjunction with the accompanying drawings.

BEST MODE FOR CARRYING OUT THE INVENTION

First embodiment

Figure 1:
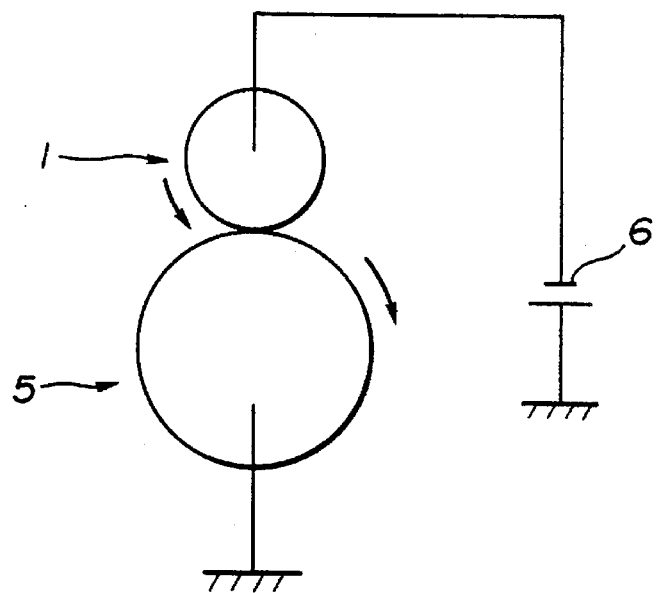
FIG. 1 schematically illustrates a charging device according to one embodiment of the invention.

Referring to FIG. 1, there is illustrated a charging device according to the first embodiment of the present invention as comprising a charging member in the form of a charging roller 1 and an object to be charged in the form of a photoconductor drum 5, the roller 1 being in rolling contact with the drum 5. The device further includes a power source 6 for applying voltage across the charging roller 1 and the drum 5 for charging the drum 5. According to the present invention, the abutment of the charging member 1 with the object 5, more specifically the outer surface of the charging roller 1 has a microhardness of up to 65 degrees.

Figure 2:
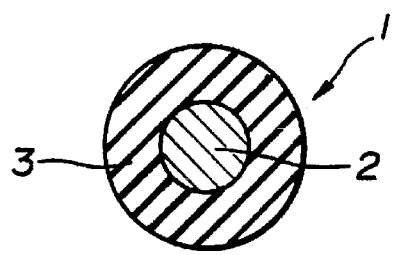
FIG. 2 is a charging member consisting of a shaft and an elastomer layer according to one embodiment of the invention.
Figure 3:
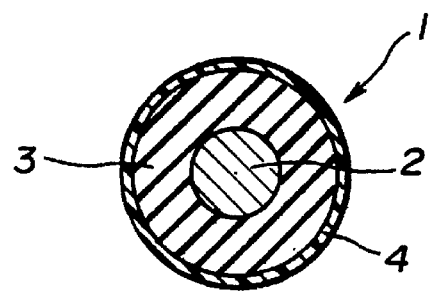
FIG. 3 is a charging member consisting of a shaft, an elastomer layer and a coating layer according to another embodiment of the invention.

The roll-shaped charging member 1 according to the invention is generally constructed by forming an annular conductive elastomer layer 3 on the outer periphery of a highly conductive cylindrical shaft 2 as shown in FIG. 2. If desired, a concentric conductive coating layer 4 may be formed on the surface of the elastomer layer 3 as shown in FIG. 3.

The shaft 2 may be made of conductive materials such as stainless steel, plated iron, brass and conductive plastics. The elastomer layer 3 formed on the outer periphery of the shaft 2 may be formed of a conductive rubber composition which is loaded with a conductive agent and either expanded or unexpanded. Exemplary rubber components include urethane rubber, silicone rubber, butadiene rubber, isoprene rubber, chloroprene rubber, polynorbornene, ethylene-propylene, styrene-butadiene, and styrene-butadiene-styrene copolymers. Preferred are polyurethanes, especially those polyurethanes prepared from a polyolefinic polyol or polytetramethylene polyol and crude MDI. A conductive agent is generally blended in the rubber composition for imparting or adjusting conductivity. Exemplary conductive agents include carbon black, graphite, metals, metal oxides (e.g., tin oxide and titanium oxide), ionic substances, and charge transfer complexes. The rubber composition should preferably be adjusted to a volume resistivity of 10 to $10^9$ Ω·cm, preferably $10^3$ to $10^7$ Ω·cm. This will be described later in detail.

The coating layer 4 may be formed of a resin composition comprising a base resin such as nylon, polyesters, phenolic resins, acrylic resins, urethane-modified acrylic resins, epoxy resins, urethane resins, urea resins, and fluoro-resins and a conductive agent such as carbon black, graphite, metal oxides (e.g., tin oxide and titanium oxide), ionic substances, and charge transfer complexes. The amount of conductive agent blended is not critical although the coating composition should preferably be adjusted to a volume resistivity of $10^3$ to $10^{11}$ Ω·cm, preferably $10^4$ to $10^{10}$ Ω·cm. Any conventional additive such as fluorine powder and silica may be added to the coating composition. The coating layer preferably has a radial thickness of about 5 to 500 μm, especially about 5 to 300 μm. The coating layer may be a single layer or consist of a plurality of concentric plies.

In the charging member and device of the invention, the abutment of the charging member 1 with the object 5 (FIG. 1), illustratively the outer surface of the charging roller 1, more specifically the surface of the elastomer layer 3 (FIG. 2) or coating layer 4 (FIG. 3) has a microhardness of up to 65 degrees, preferably up to 60 degrees, more preferably 1 to 55 degrees. Adjustment of hardness to this range overcomes the image defect-causing problems such as toner deposition and fusion. The hardness adjustment in terms of microhardness is effective even when the charging member takes the form of a charging roller having a coating layer as shown in FIG. 3 which is conventionally difficult to achieve improvements by adjusting the hardness in terms of Ascar C hardness.

The microhardness used herein is determined by forcing a needle indenter having a diameter of 0.16 mm and a length of 0.5 mm against a sample under a load of 35–0.3 g to deform the sample and measuring the depth of penetration of the needle, that is, deformation of the sample. The microhardness tester can measure the hardness of a thin or small sized sample which is difficult to measure with conventional hardness testers where the surface hardness of a charging member is measured by a microhardness tester, the resulting hardness measurement is that of a very thin or shallow surface-adjacent region of the member as compared with the conventional Ascar C hardness measurement. In this regard, the charging member of the invention is such that a very thin surface-adjacent region of the member has a relatively low hardness. The microhardness can be measured by a commercially available microhardness tester, for example, microhardness tester MD-1 by Kobunshi Keiki K.K.

The surface or abutment of the charging member may be adjusted in microhardness by any desired technique such as a choice of the composition or formation of the elastomer layer 3. In the embodiment of FIG. 3 having a coating layer, the thickness of the coating layer may be adjusted to provide a desired microhardness.

The charging member of the invention generally takes the form of a roll or a plate although it may be configured to a block, spherical or other shape depending on the shape and application of an object to be charged. Where the charging member has a shape other than a roll, an elastomer layer and a coating layer are of the same compositions as in the above-mentioned roll embodiment and may be formed on a substrate of plate, block or spherical shape instead of the cylindrical shaft.

There has been described a charging member which has improved charging properties, restrains the toner from depositing or fusing thereto, and durably performs for a long term. The charging device using the charging member ensures effective charging for a long term without inconvenience resulting from toner deposition and fusion.
Second embodiment In the second embodiment, the charging member is often formed of a composition based on polyurethane. If desired and preferably, the urethane composition is expanded. The expanding method is not critical although the use of blowing agents or mechanical agitation to introduce bubbles is preferred.

It is not critical how polyurethane is prepared although polyurethane is preferably prepared by blending a polyol with liquid MDI, a conductivity-imparting material, and a crosslinking reaction catalyst and heating the mixture for curing. The polyol component used herein may be selected from polyether polyols, polyester polyols, polybutadiene polyols, polyisoprene polyols, polyols in the form of glycerin having polyethylene oxide or polypropylene oxide addition polymerized thereto, ethylene glycol, propane diol, and butane diol. The liquid MDI may be crude diphenylmethane diisocyanate (MDI) and/or urethonimine-modified diphenylmethane diisocyanate. The conductivity-imparting material may be selected from a quaternary ammonium salt, an electron acceptor capable of forming a charge transfer complex, an inorganic salt, and carbon black. It is especially preferred to use crude MDI as a curing agent. Preferably by curing in a mold of predetermined dimensions, there is formed polyurethane having a smooth surface layer which is generally known as a self skin or integral skin.

In another preferred procedure, the polyol component is previously reacted with liquid MDI such as crude MDI and/or urethonimine-modified diphenylmethane diisocyanate to form a prepolymer.

According to the invention, at least a surface layer of the charging member is preferably formed of a composition comprising polyurethane which is prepared using a polyolefin polyol or polyoxytetramethylene polyol or a mixture thereof as the polyol component and liquid MDI such as crude diphenylmethane diisocyanate, urethonimine-modified diphenylmethane diisocyanate, carbodiimide-modified diphenylmethane diisocyanate and urethane-modified diphynylmethane diisocyanate as the isocyanate component.

The polyolefin polyols used herein include polybutadiene polyols, polyisoprene polyols and hydrogenated products thereof.

The polyol and the isocyanate are preferably blended such that the ratio of isocyanate group to hydroxyl group in the polyol may range from 0.7 to 2.0, more preferably from 0.8 to 1.3. Below the range, the photoconductor would sometimes be stained. Beyond the range, the resulting polyurethane would be too hard.

The isocyanate component used herein is preferably one having a functionality of 2.0 to 5.0, more preferably 2.5 to 4.0. Below the range, the photoconductor would sometimes be stained. Beyond the range, the resulting polyurethane would be brittle.

For imparting conductivity, a well-known conductive filler such as carbon black, inorganic salt such as lithium perchlorate, quaternary ammonium salt, and electron acceptor capable of forming a charge transfer complex may be added alone or in admixture. Any species of carbon black may be used although Ketjen black, acetylene black, oil furnace black, thermal carbon and channel black are preferred. Better results are obtained particularly when there is blended carbon black having a volatile content of up to 10% upon heating at 950° C. for 7 minutes. If carbon black having a volatile content beyond the above-defined range is blended, bleeding components from the carbon black itself would migrate to the member surface. The amount of carbon black blended is not critical although about 0.05 to 50 parts by weight of carbon black is typically blended per 100 parts by weight of the polyol.

The inorganic salt used is not critical although it is preferably selected from salts of alkali and alkaline earth metals such as lithium, sodium, potassium and calcium with perchloric acid, hydrochloric acid, borofluoric acid, and sulfuric acid.

The quaternary ammonium salt used is not critical although it is preferably selected from salts of quaternary ammonium such as lauryl trimethyl ammonium, stearyl trimethyl ammonium, octadecyl trimethyl ammonium, dodecyl trimethyl ammonium, hexadecyl trimethyl ammonium, modified aliphatic dimethyl ethyl ammonium, tetraethyl ammonium, and tetrabutyl ammonium with perchloric acid, hydrochloric acid, borofluoric acid, sulfuric acid, and ethosulfuric acid.

The electron acceptor capable of forming a charge transfer complex used is not critical although it is preferably selected from tetracyanoethylene and derivatives thereof, tetracyanoquinodimethane and derivatives thereof, benzoquinone and derivatives thereof, chloroanil and derivatives thereof, anthraquinone and derivatives thereof, anthracene and derivatives thereof, dichlorodicyanobenzoquinone and derivatives thereof, ferrocene and derivatives thereof, and phthalocyanine and derivatives thereof.

With respect to electric resistance, the charging member preferably has a volume resistivity of $1 \times 10^4$ to $1 \times 10^{12}$ $\Omega \cdot cm$, more preferably $1 \times 10^4$ to $1 \times 10^{10}$ $\Omega \cdot cm$. With respect to hardness, the roller-shaped charging member preferably has an Ascar C hardness of up to 50 degrees, more preferably up to 42 degrees. Where the polyurethane is an expanded one, the foam preferably has a cell diameter of about 20 to 300 µm.

Preferably the surface layer of the charging member comprising polyurethane according to the second embodiment should have a microhardness of up to 65 degrees, more preferably up to 60 degrees, most preferably up to 55 degrees. Also the surface layer of the charging member comprising polyurethane should preferably have a surface roughness Rz of up to 30 µm as expressed by ten point average roughness according to JIS B-0601.

Figure 4:
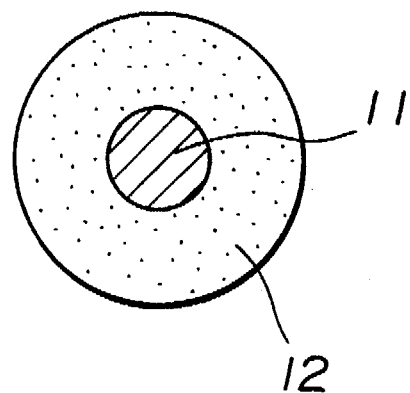
FIG. 4 is a charging member consisting of a shaft and a polyurethane layer according to a further embodiment of the invention.

Referring to FIG. 4, the charging member in the form of a roller is illustrated as comprising an annular polyurethane layer 12 surrounding the outer periphery of a cylindrical shaft 11. The shaft 11 may be made of highly conductive materials such as stainless steel, plated iron, brass and conductive plastics. The composition of the polyurethane layer 12 is as defined above.

Figure 5:
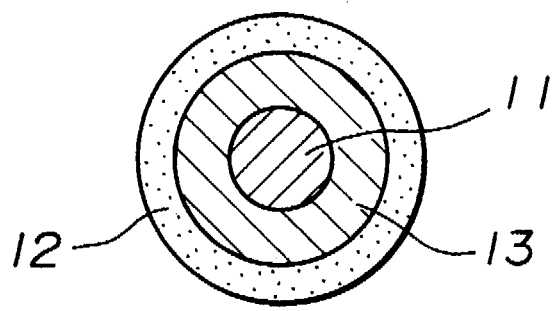
FIG. 5 is a charging member consisting of a shaft, an elastomer layer and a polyurethane layer according to a still further embodiment of the invention.
Figure 6:
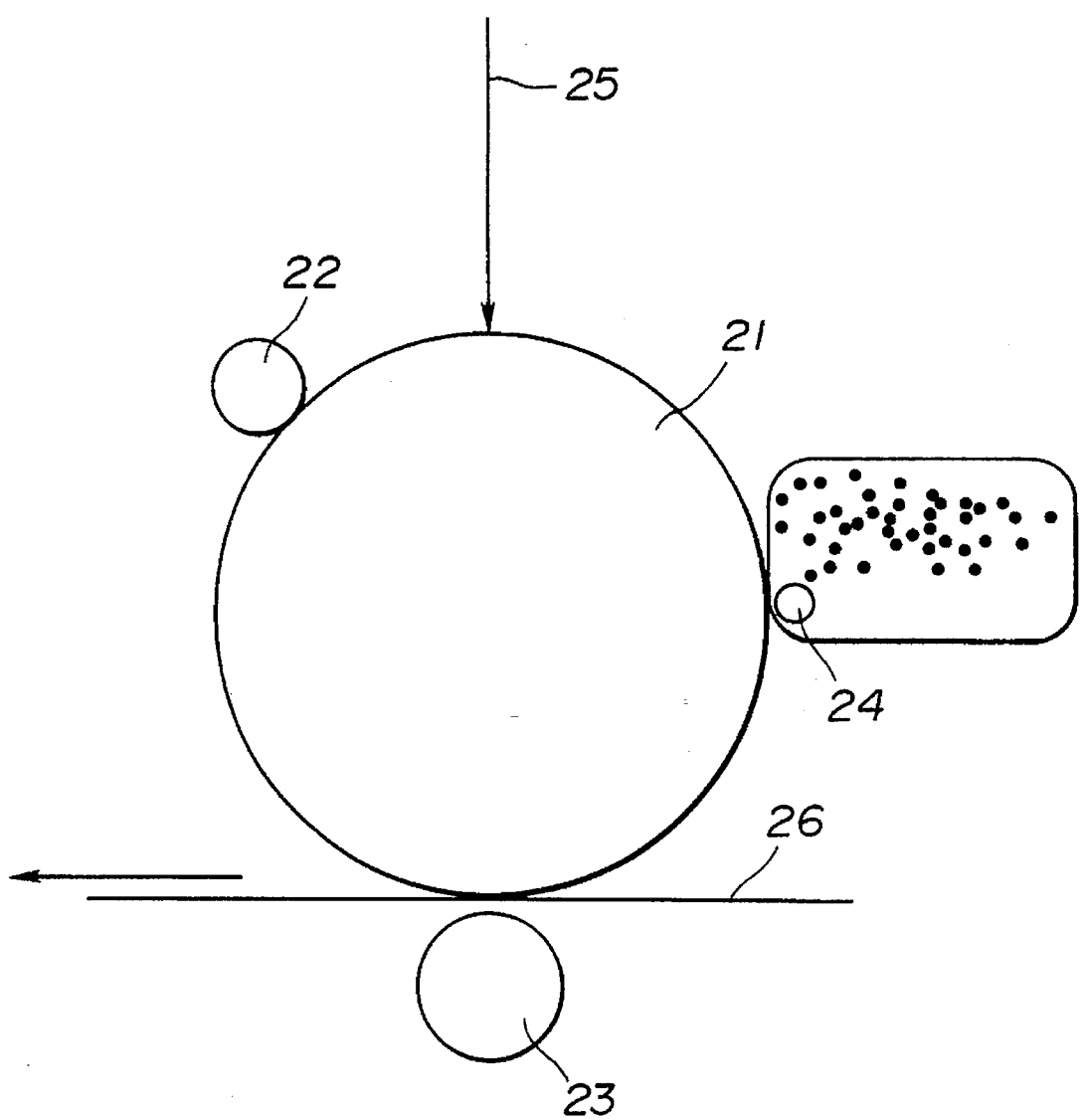
FIG. 6 schematically illustrates the outline of an electrophotographic apparatus.

Referring to FIG. 5, the charging member in the form of a roller is illustrated as comprising a cylindrical shaft 11, an annular conductive elastomer layer 13 surrounding the outer periphery of the shaft 11, and a concentric polyurethane layer 12 surrounding the elastomer layer 13. The shaft 11 is as described above. The conductive elastomer layer 13 may be formed of butadiene rubber, chloroprene rubber, silicone rubber, urethane rubber or the like. The polyurethane layer 12 is of a composition as defined above and may be formed by a conventional molding or dipping method.

From the standpoints of environmental stability, noise and image quality improvement, the charging member of the invention may be further provided thereon with at least one of conductive, semi-conductive and insulating overcoating layers. Such an overcoating layer is preferably formed of nylon. Especially a nylon copolymer containing at least 15% by weight of nylon 12 is effective for improving charging environmental stability. The nylon copolymer preferably has a melting point of up to 120° C., more preferably 70° to 120° C., most preferably 90° to 110° C. The overcoating layer has any desired volume resistivity, preferably of $10^6$ to $10^{13}$ $\Omega \cdot cm$. For volume resistivity adjustment, carbon black or particulate metal oxide such as tin oxide and titanium oxide may be blended alone or in admixture.

Also preferably the overcoating layer is formed of a resin composition comprising a urethane-modified acrylic resin containing 5 to 70% by weight of an acrylic resin component having a glass transition temperature of room temperature to 80° C. This overcoating layer has any desired volume resistivity, preferably of $10^6$ to $10^{13}$ $\Omega \cdot cm$. For volume resistivity adjustment, carbon black or particulate metal oxide such as tin oxide and titanium oxide may be blended alone or in admixture. The urethane-modified acrylic resin may further contain 1 to 50% by weight of a silicone component.

Alternatively, particles having a particle size of 35 to 100 µm may be distributed on the charging member in the proximity to the surface for noise reduction purposes. The particles may be either insulating or conductive. Also useful are insulating particles coated with a conductive or elastomeric material wherein about 3 to 50 parts by weight of the particles is preferably used per 100 parts by weight of the polymer forming the conductive or elastomeric coating.

EXAMPLE

Examples of the invention are given below by way of illustration and not by way of limitation. All parts are by weight.

Example 1

A charging roller of the structure shown in FIG. 2 was prepared by applying a conductive polyurethane composition consisting of 100 parts of a polyurethane prepared from an isoprene polyol and crude MDI and 20 parts of carbon onto the outer periphery of a stainless steel shaft to form an elastomer layer. The roller at the outer surface had a volume resistivity of $1.1 \times 10^6$ $\Omega \cdot cm$, an Ascar C hardness of 72 degrees, and a microhardness of 49 degrees.

Example 2

A charging roller of the structure shown in FIG. 3 was prepared by applying a conductive composition consisting of 100 parts of a co-crosslinked polybutadiene-liquid polyisoprene product and 20 parts of carbon onto the outer periphery of a stainless steel shaft to form an elastomer layer and dipping in a urethane liquid loaded with carbon to form a urethane coating of 110 µm thick on the elastomer layer. By dipping in a nylon liquid containing $TiO_2$, a nylon coating of 10 µm thick was formed on the urethane coating. The roller at the outer surface had a volume resistivity of $2.3 \times 10^6$ $\Omega \cdot cm$, an Ascar C hardness of 58 degrees, and a microhardness of 61 degrees.

Comparative Example 1

A charging roller was prepared as in Example 2 except that the urethane coating was 210 µm thick. The roller at the outer surface had a volume resistivity of $1.5 \times 10^6$ $\Omega \cdot cm$, an Ascar C hardness of 61 degrees, and a microhardness of 77 degrees.

Comparative Example 2

A charging roller of the structure shown in FIG. 3 was prepared by applying a conductive composition consisting of 100 parts of an expanded polyurethane and 17 parts of carbon onto the outer periphery of a stainless steel shaft to form an elastomer layer and dipping in a urethane-modified acrylic resin liquid loaded with carbon to form an acrylic coating of 200 µm thick on the elastomer layer. The roller at the outer surface had a volume resistivity of $9.5 \times 10^5$ Ω·cm, an Ascar C hardness of 57 degrees, and a microhardness of 78 degrees.

The rollers of Examples 1–2 and Comparative Examples 1–2 were examined by the following tests. The results are shown in Table 1.

(1) Toner fusion

After a laser printer having a roller incorporated therein was continuously operated to print a standard picture on 8,000 sheets, a black picture was printed. The printed sheet was observed to inspect white spots and other defects in the black picture. Note that any toner fused to the photoconductor results in an unacceptable white spot.

(2) Toner deposition

After a laser printer having a roller incorporated therein was continuously operated to print a standard picture on 8,000 sheets, the same picture was printed in an environment at 15° C. and RH 10%. The printed sheet was observed to inspect grained areas and other defects. Note that any toner deposited on the photoconductor causes charging failure, resulting in defects.

TABLE 1

| Example | Toner fusion | Toner deposition |
| --- | --- | --- |
| E 1 | few white spots | no grained area |
| E 2 | a few white spots | a few grained areas |
| CE 1 | many white spots | grained areas |
| CE 2 | many white spots | grained areas |

It is evident from Table 1 that the charging member having a surface microhardness of up to 65 degrees within the scope of the invention precludes fusion and deposition of the toner to the photoconductor and is improved in durability. It is also seen from Examples 1–2 and Comparative Examples 1–2 that a change of microhardness is not correlated to a change of Ascar C hardness and therefore, these hardnesses behave independently of each other.

Example 3

By mixing 100 parts of a polyether polyol obtained by adding propylene oxide and ethylene oxide to glycerin and having a molecular weight of 5,000, 9.2 parts of crude diphenylmethane diisocyanate, 4 parts of a silicone surfactant, 0.035 part of dibutyltin dilaurate, and 0.01 part of tetracyanoquinodimethane by means of a hand mixer, and applying the mixture to a metallic shaft having a diameter of 6 mm to form a urethane foam cover having its own skin, there was obtained a charging roller having a diameter of 16.5 mm and a length of 225 mm.

An electrophotographic apparatus is shown in FIG. 5 as comprising a photoconductor drum 21 and a charging roller 22, a transfer roller 23, and a developing roller 24 circumferentially arranged around the drum 21 in contact therewith wherein the rotating drum 21 after charging is exposed to a laser beam 25 to form a latent image and the developed image is transferred to a sheet of paper 26, typically plain paper. The charging roller prepared above was incorporated in the electrophotographic apparatus, which was first operated in an atmospheric environment to print gray scale, solid black and solid white pictures. The printed images were satisfactory. With the roller in contact with the photoconductor drum, the apparatus was kept for 5 days in an environment at 50° C. and RH 85%. The photoconductor drum was observed to find no fog or stain on the surface. Gray scale, solid black and solid white pictures were printed again, obtaining satisfactory images.

Example 4

A charging roller was prepared as in Example 3 except that 0.2 part of tetrabutyl ammonium borofluoride was used instead of 0.01 part of tetracyanoquinodimethane. It was examined by a similar printing test. No stain occurred on the photoconductor as in Example 3.

Example 5

A charging roller was prepared as in Example 3 except that there was used a mixture of 100 parts of a polyisoprene polyol having an OH value of 47.1, 12.7 parts of crude diphenylmethane diisocyanate, 1 part of a silicone surfactant, 0.001 part of dibutyltin dilaurate, and 8 parts of oil furnace black having a surface area of 85 m²/g, a DBP oil absorption of 110 ml/100 g, and a volatile content of 1.3%. It was examined by a similar printing test. No stain occurred on the photoconductor as in Example 3.

Example 6

A charging roller was prepared as in Example 3 except that the same ingredients as in Example 3 excluding the silicone surfactant were mixed in vacuum by means of a laboratory mixer. It was examined by a similar printing test. No stain occurred on the photoconductor as in Example 3.

Comparative Example 3

A charging roller was prepared as in Example 3 except that 6 parts of tolylene diisocyanate was used as a curing agent instead of 9.2 parts of crude diphenylmethane diisocyanate.

As in Example 3, the charging roller was incorporated in the electrophotographic apparatus, which was first operated in an atmospheric environment to print gray scale, solid black and solid white pictures. The printed images were satisfactory. With the roller in contact with the photoconductor drum, the apparatus was kept for 5 days in an environment at 50° C. and RH 85%. The photoconductor drum was observed to find fog on the surface. Gray scale, solid black and solid white pictures were printed again to find that the resulting gray scale images were distorted at areas corresponding to the fogged areas on the photoconductor drum.

Example 7

A roller was prepared by blending 300 g of a polyisoprene polyol having a molecular weight of 2,800 with 60 g of FT carbon, agitating the mixture for 60 minutes, adding 38.5 g of crude MDI to the mixture, and agitating the mixture for 3 minutes. The reaction mixture was cast into a mold having a shaft disposed therein and heated at 90° C. for 10 hours for curing reaction. The roller at the outer surface had a microhardness of 49 degrees and a surface roughness Rz of 6 µm.

Example 8

A urethane paint was prepared by adding 500 g of glass beads to 200 g of polyisoprene polyol, 100 g of toluene, 100 g of methyl ethyl ketone, and 42 g of FT carbon, dispersing the ingredients for 10 hours in a red devil, adding 25.7 g of crude MDI to the dispersion, and dispersing the ingredients for 5 minutes.

A composition consisting of 100 parts of polybutadiene rubber and 18 parts of carbon was applied to a shaft to form a polybutadiene rubber layer. The rubber layer-bearing shaft was dipped in the urethane paint to form a urethane layer of 100 μm thick on the rubber layer, completing a roller. The roller at the outer surface had a microhardness of 52 degrees and a surface roughness Rz of 5 μm.

Comparative Example 4

A roller was prepared by blending 300 g of a polyether polyol having a molecular weight of 5,000 with 60 g of FT carbon, agitating the mixture for 60 minutes, adding 18.3 g of TDI to the mixture, and agitating the mixture for 3 minutes. The reaction mixture was cast into a mold having a shaft disposed therein and heated at 90° C. for 10 hours for curing reaction. The roller at the outer surface had a microhardness of 70 degrees and a surface roughness Rz of 7 μm.

Comparative Example 5

A roller was prepared by blending 300 g of a polyisoprene polyol having a molecular weight of 2,800 with 60 g of FT carbon, agitating the mixture for 60 minutes, adding 23.7 g of TDI to the mixture, and agitating the mixture for 3 minutes. The reaction mixture was cast into a mold having a shaft disposed therein and heated at 90° C. for 10 hours for curing reaction. The roller at the outer surface had a microhardness of 59 degrees and a surface roughness Rz of 8 μm.

The rollers of Examples 7–8 and Comparative Examples 4–5 were examined by the following tests. The results are shown in Table 2.

(1) Toner fusion

After a laser printer having a roller incorporated therein was continuously operated to print a standard picture on 8,000 sheets, a black picture was printed. The printed sheet was observed to inspect white spots and other defects in the black picture.

(2) Toner deposition

After a laser printer having a roller incorporated therein was continuously operated to print a standard picture on 8,000 sheets, the same picture was printed in an environment at 15° C. and RH 10%. The printed sheet was observed to inspect grained areas and other defects.

(3) Photoconductor staining

With the roller in contact with the photoconductor drum, the electrophotographic apparatus was kept for one month in an environment at 40° C. and RH 95%. Thereafter, the apparatus was operated for printing at room temperature. The printed image was examined for any defect due to staining.

(4) Photoconductor seizure

The roller was kept in contact with the photoconductor drum for 3 days in an environment at 60° C. It was then examined to determine whether any seizure occurred between the roller and the drum.

TABLE 2

|  | E7 | E8 | CE4 | CE5 |
|---|---|---|---|---|
| Toner fusion (white spots) | few | few | many | few |
| Toner deposition (grained areas) | nil | nil | several | nil |
| Staining | nil | nil | stained | stained |
| Seizure | nil | nil | seized | seized |

Although some preferred embodiments have been described, many modifications and variations may be made thereto in the light of the above teachings. It is therefore to be understood that within the scope of the appended claims, the invention may be practiced otherwise than as specifically described.

We claim:

1. A charging member for electrically charging an object by placing the member in contact with the object and applying voltage between them, the surface of the charging member in contact with the object having a microhardness of up to 65 degrees.

2. A charging member for electrically charging an object by placing the member in contact with the object and applying voltage between them, the surface of the charging member in contact with the object being formed of a polyurethane whose isocyanate component is liquid MDI.

3. The charging member of claim 2 wherein said liquid MDI is selected from the group consisting of crude diphenylmethane diisocyanate, urethonimine-modified diphenylmethane diisocyanate, and carbodiimide-modified diphenylmethane diisocyanate, and mixtures thereof.

4. The charging member of claim 2 wherein a polyol component of the polyurethane is a polyolefin polyol, a polyoxytetramethylene polyol or a mixture thereof.

5. The charging member of claim 2 wherein the surface of the charging member has a volume resistivity of $10^4$ to $10^{11}$ Ω·cm.

6. The charging member of claim 2 wherein the surface of the charging member has a 10 point average roughness Rz of up to 30 μm.

7. The charging member of claim 2 wherein the surface of the charging member has a microhardness of up to 65 degrees.

8. A charging device for electrically charging an object comprising a charging member adapted to be placed in contact with the object and means for applying voltage between said charging member and the object, the surface of said charging member in contact with the object having a microhardness of up to 65 degrees.

9. A charging device for electrically charging an object comprising a charging member adapted to be placed in contact with the object and means for applying voltage between said charging member and the object, the surface of said charging member in contact with the object being formed of a polyurethane whose isocyanate component is liquid MDI.

10. The charging device of claim 9 wherein said liquid MDI is selected from the group consisting of crude diphenylmethane diisocyanate, urethonimine-modified diphenylmethane diisocyanate, and carbodiimide-modified diphenylmethane diisocyanate, and mixtures thereof.

11. The charging device of claim 9 wherein a polyol component of the polyurethane is a polyolefin polyol, a polyoxytetramethylene polyol or a mixture thereof.

12. The charging device of claim 9 wherein the surface of the charging member has a volume resistivity of $10^4$ to $10^{11}$ Ω·cm.

13. The charging device of claim 9 wherein the surface of the charging member has a 10 point average roughness Rz of up to 30 μm.

14. The charging device of claim 9 wherein the surface of the charging member has a microhardness of up to 65 degrees.

* * * * *